US012731831B2

(12) United States Patent
Cho et al.

(10) Patent No.: US 12,731,831 B2
(45) Date of Patent: Sep. 8, 2026

(54) RECHARGEABLE BATTERY

(71) Applicant: SAMSUNG SDI CO., LTD., Yongin-si (KR)

(72) Inventors: Wonwook Cho, Yongin-si (KR); Heejung Ko, Yongin-si (KR); Eun-Bee Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 564 days.

(21) Appl. No.: 17/999,034

(22) PCT Filed: Jan. 6, 2021

(86) PCT No.: PCT/KR2021/000130

§ 371 (c)(1),
(2) Date: Nov. 16, 2022

(87) PCT Pub. No.: WO2021/241832

PCT Pub. Date: Dec. 2, 2021

(65) Prior Publication Data

US 2023/0187741 A1 Jun. 15, 2023

(30) Foreign Application Priority Data

May 29, 2020 (KR) ........................ 10-2020-0065164

(51) Int. Cl.
*H01M 50/109* (2021.01)
*H01M 10/04* (2006.01)
(Continued)

(52) U.S. Cl.
CPC ..... *H01M 50/109* (2021.01); *H01M 10/0427* (2013.01); *H01M 50/131* (2021.01);
(Continued)

(58) Field of Classification Search
None
See application file for complete search history.

(56) References Cited

U.S. PATENT DOCUMENTS 6,468,691 B1 10/2002 Malay et al.
9,318,269 B2 4/2016 Chiu et al.
(Continued)

FOREIGN PATENT DOCUMENTS

KR 10-2006-0058646 A 5/2006
KR 10-2017-0017514 A 2/2017
(Continued)

OTHER PUBLICATIONS

International Search Report of PCT/KR2021/000130, Apr. 21, 2021, 3 pages.
(Continued)

*Primary Examiner* — Ryan S Cannon
*Assistant Examiner* — Karen J. Armstrong
(74) *Attorney, Agent, or Firm* — Womble Bond Dickinson (US) LLP

(57) ABSTRACT

A rechargeable battery according to an embodiment of the present invention includes: a first case receiving an electrode assembly and having a first opening; a second case having a second opening smaller than the first opening and coupled to the inner surface of the first case with the outer surface while covering the electrode assembly; an insulating material interposed between the first case and the second case to form an electrically insulating state; a plurality of protruded parts protruded onto the outer surface of the second case; and a plurality of accommodating parts formed in the first case and coupled to the protruded part, wherein the first case and the second case are concluded to form a closed state when the protruded part is coupled to the accommodating part.

7 Claims, 16 Drawing Sheets

(51) Int. Cl.
*H01M 50/131* (2021.01)
*H01M 50/153* (2021.01)
*H01M 50/183* (2021.01)
*H01M 50/533* (2021.01)

(52) U.S. Cl.
CPC ....... *H01M 50/153* (2021.01); *H01M 50/183* (2021.01); *H01M 50/533* (2021.01)

(56) References Cited

U.S. PATENT DOCUMENTS

2007/0207386 A1 9/2007 Konishiike et al.
2009/0311594 A1* 12/2009 Uh ...................... H01M 50/169 429/163
2012/0015243 A1* 1/2012 Han .................... H01M 50/103 429/185
2012/0064393 A1 3/2012 Schimmele et al.
2015/0236370 A1 8/2015 Ensling et al.
2017/0040575 A1 2/2017 Bang
2020/0381683 A1* 12/2020 Shimizu ................ H01M 50/24
2021/0111454 A1 4/2021 Zhu et al.

FOREIGN PATENT DOCUMENTS

KR 10-2019-0010566 A 1/2019
KR 10-2020-0007559 A 1/2020
WO WO 2010-130480 A1 11/2010

OTHER PUBLICATIONS

Written Opinion of PCT/KR2021/000130, Apr. 21, 2021, 3 pages.
Korean Office Action for KR Application No. 10-2020-0065164, dated May 20, 2025, 6 pages.

* cited by examiner

RECHARGEABLE BATTERY

CROSS-REFERENCE TO RELATED APPLICATION(S)

This application is a U.S. National Phase Patent Application of PCT/KR2021/000130, filed Jan. 6, 2021, which claims priority to Korean patent application 10-2020-0065164, filed on May 29, 2020, the entire content of each of which is hereby incorporated by reference.

TECHNICAL FIELD

The present invention relates to a rechargeable battery. More particularly, the present invention relates to an ultra-small rechargeable battery.

BACKGROUND ART

Unlike a primary battery that is incapable of being recharged, a rechargeable battery can be repeatedly charged and discharged. A low capacity rechargeable battery has been used for small electronic devices such as a mobile phone, a laptop computer, and a camcorder, and a large capacity battery has been widely used as a power source for driving a motor of a hybrid vehicle.

A representative rechargeable battery includes a nickel-cadmium (Ni—Cd) battery, a nickel-metal hydride (Ni-MH) battery, a lithium (Li) battery, and a lithium ion (Li-ion) rechargeable battery. Particularly, the lithium ion secondary battery has a higher operation voltage than the nickel-cadmium battery or the nickel-metal hydride battery that is mainly used as a portable electric equipment power source by about three times. Also, the lithium ion secondary battery is widely used in an aspect that energy density per unit weight is high.

In particular, as a demand for wearable devices such as headphones, earphones, smartwatches, and body-mounted medical devices which use Bluetooth has increased, the need for rechargeable batteries of which energy density is high and is ultra-small has been increasing.

The ultra-small rechargeable battery has important tasks of securing required electrical capacity within a limited size, implementing an efficient structure while improving an effective low weight, and improving structural stability.

The above information disclosed in this Background section is only for enhancement of understanding of the background of the invention, and therefore it may contain information that does not form the prior art that is already known in this country to a person of ordinary skill in the art.

DISCLOSURE

Technical Problem

One aspect of the present invention is to provide a rechargeable battery with improved safety. In addition, one aspect of the present invention is to provide a rechargeable battery that improves total height dispersion.

Technical Solution

A rechargeable battery according to an embodiment of the present invention includes: a first case receiving an electrode assembly and having a first opening; a second case having a second opening smaller than the first opening and coupled to the inner surface of the first case with the outer surface while covering the electrode assembly; an insulating material interposed between the first case and the second case to form an electrically insulating state; a plurality of protruded parts protruded onto the outer surface of the second case; and a plurality of accommodating part formed in the first case and coupled to the protruded part, wherein the first case and the second case are concluded to form a closed state when the protruded part is coupled to the accommodating part.

The electrode assembly may include a first electrode, a second electrode, and a separator disposed therebetween, the first case may be connected to the first electrode by a first electrode tab, and the second case may be connected to the second electrode with a second electrode tab.

The insulating material may be interposed between the protruded part and the accommodating part to be electrically insulated.

The insulating material may be interposed between the protruded part and the accommodating part to close and seal the inside and outside where the first case and the second case are fastened.

The accommodating part may be formed as a through-hole (e.g., a through-hole with a semicircle of the first case with a downward plane on top) or a groove in the first case, and may have a concave shape to which the protruded part is coupled.

When viewed in a longitudinal cross-section, the protruded part may have one shape of a quarter ellipse, a semi-ellipse, a triangle, a quadrangle, an opened semi-elliptical ring, a closed semi-elliptical ring, and a semi-elliptical cylinder, and may have a convex shape that is coupled to the accommodating part.

In a state that the protruded part is coupled to the accommodating part, the insulating material may be interposed between the inner bottom of the first case and the end of the second case forming the second opening to be electrically insulated.

The accommodating part may be provided in plural and disposed at an equal interval along the circumferential direction of the first case, and the protruded part may be provided in plural to correspond to the accommodating part and disposed at an equal interval along the circumferential direction of the second case.

Advantageous Effects

In the rechargeable battery according to an embodiment of the present invention, the first case and the second case are electrically insulated through the insulating material interposed therebetween, and the protruded part of the second case is coupled to the accommodating part of the first case, and accordingly, even when a strong impact such as a drop is applied, a mutual separation and a relative rotation of the first case and the second case may be prevented.

Accordingly, the breakage of the first and second electrode tabs connecting the first and second electrodes of the electrode assembly to the first and second cases, respectively, may be prevented. Since the first and second electrode tabs remain connected to the first and second cases, shorting of the first and second electrodes by the first and second electrode tabs may be prevented. In addition, since the first and second cases are accurately combined due to the combination of the accommodating part and the protruded part, a total height distribution in a plurality of rechargeable batteries may be reduced.

MODE FOR INVENTION

Figure 1:
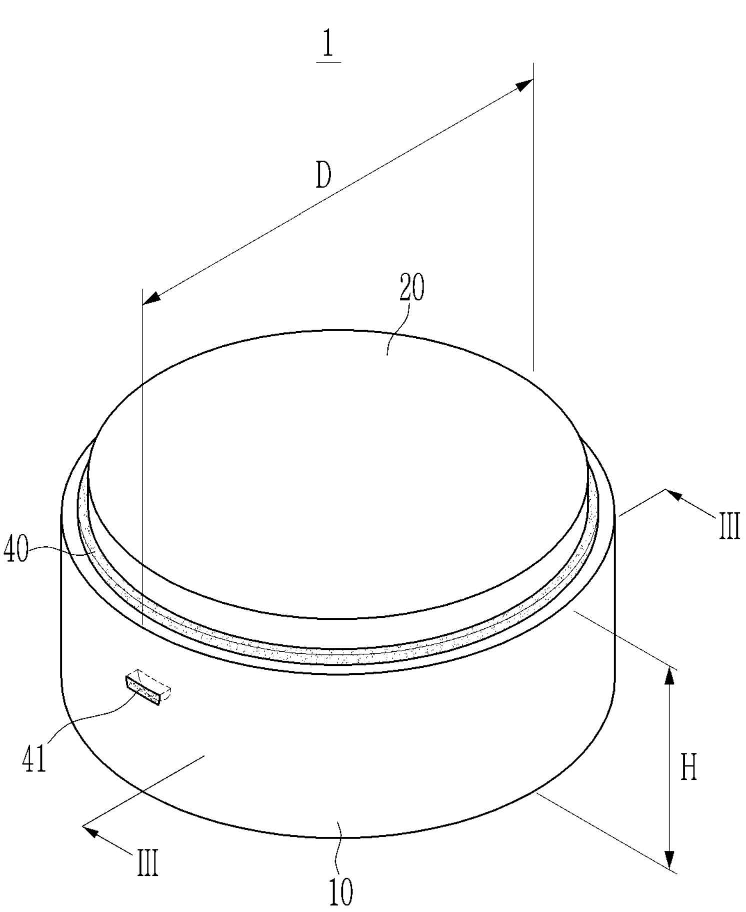
FIG. 1 is a perspective view showing a rechargeable battery according to a first embodiment of the present invention.

The present invention will be described more fully hereinafter with reference to the accompanying drawings, in which embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

The drawings and description are to be regarded as illustrative in nature and not restrictive. Like reference numerals designate like elements throughout the specification.

Further, since sizes and thicknesses of constituent members shown in the accompanying drawings are arbitrarily given for better understanding and ease of description, the present invention is not limited to the illustrated sizes and thicknesses.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise", and variations such as "comprises" or "comprising", will be understood to imply the inclusion of stated elements but not the exclusion of any other elements.

A rechargeable battery according to an embodiment of the present invention, which is an ultra-compact battery, may be a coin cell or a button cell. Here, the coin cell or the button cell is a thin coin-type or button-type cell, and means a battery having a ratio (H/D) of a height (H) to a diameter (D) of 1 or less (referring to FIG. 1).

Since the coin cell or the button cell is mainly cylindrical, a horizontal cross-section is circular, but the present invention is not limited thereto, and a horizontal cross-section may be oval or polygonal. At this time, a diameter is set as the maximum distance of the case exterior circumference based on the horizontal direction of the battery, and the height is set as the minimum distance between the outer plane surfaces of the case of the battery.

However, the present invention is not limited to the coin cell or the button cell that is an example of the present invention, and a battery of the present invention may be a cylindrical-type or pin-type battery. Hereinafter, a case in which a rechargeable battery according to an embodiment of the present invention is a coin cell or a button cell will be described in detail as an example.

Figure 2:
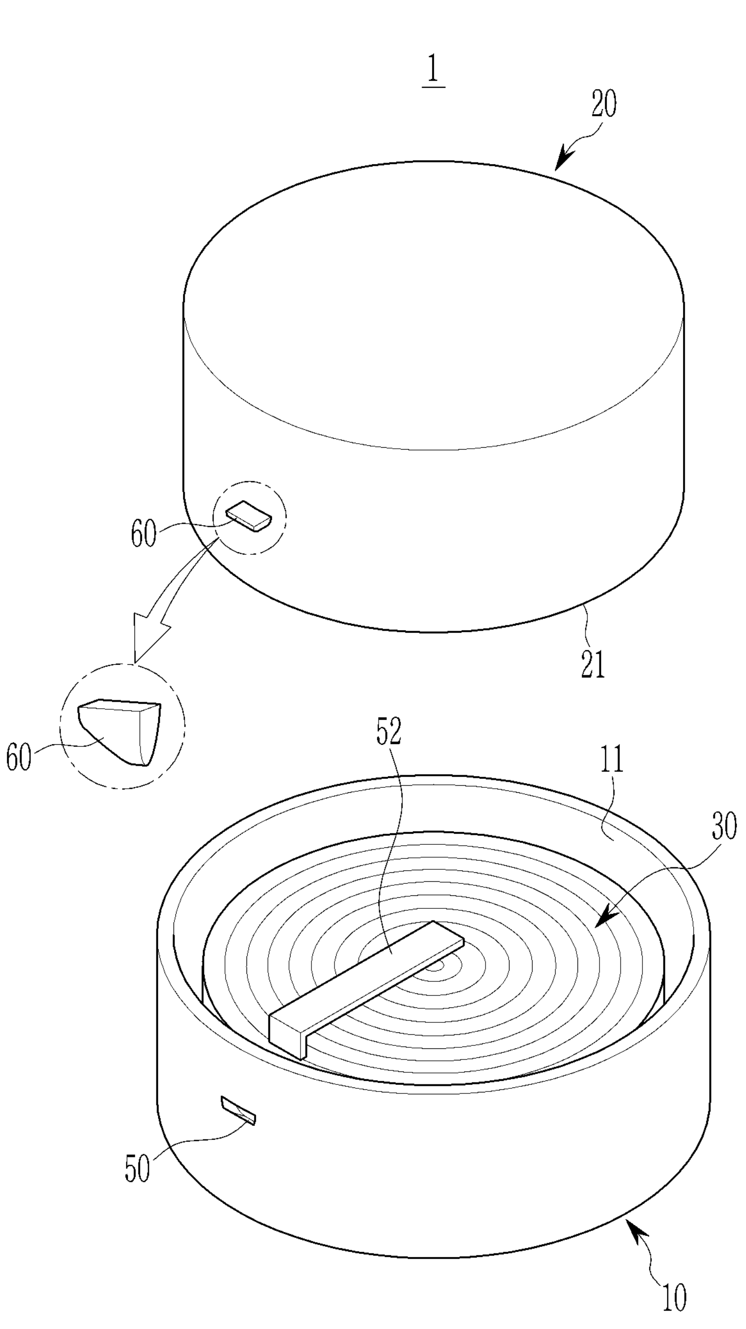
FIG. 2 is an exploded perspective view of a rechargeable battery of FIG.
Figure 3:
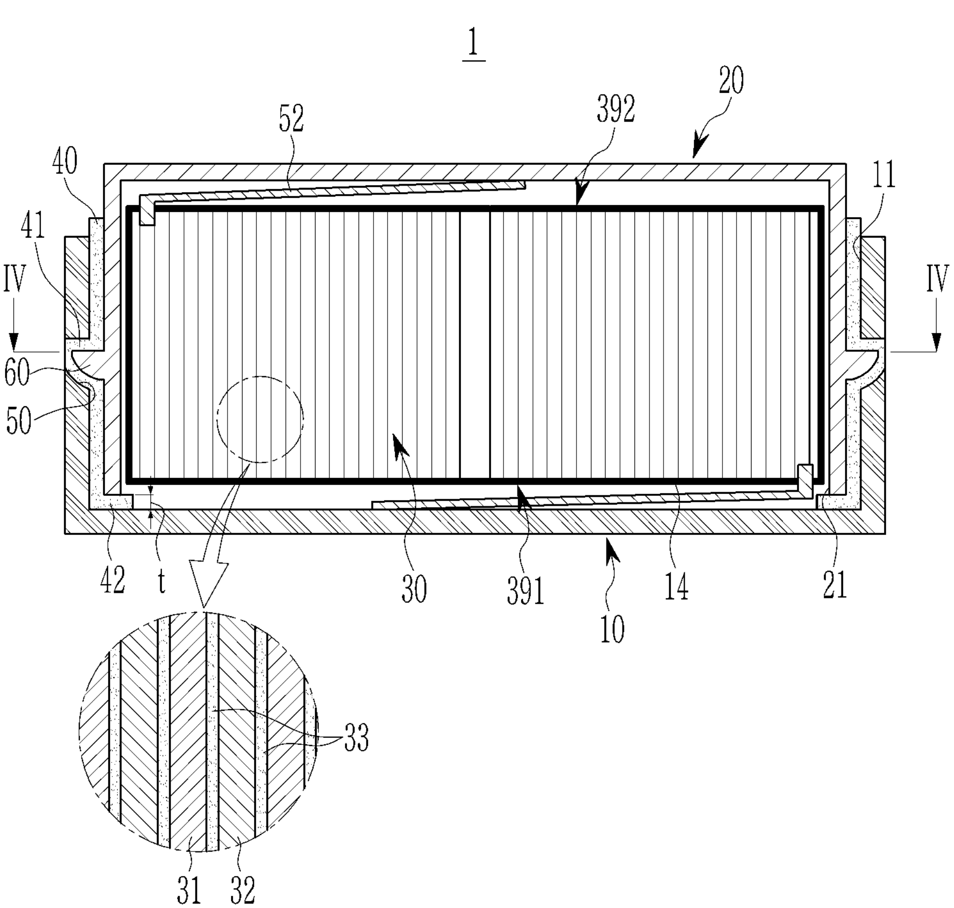
FIG. 3 is a cross-sectional view taken along a line III-III of FIG. 1.
Figure 4:
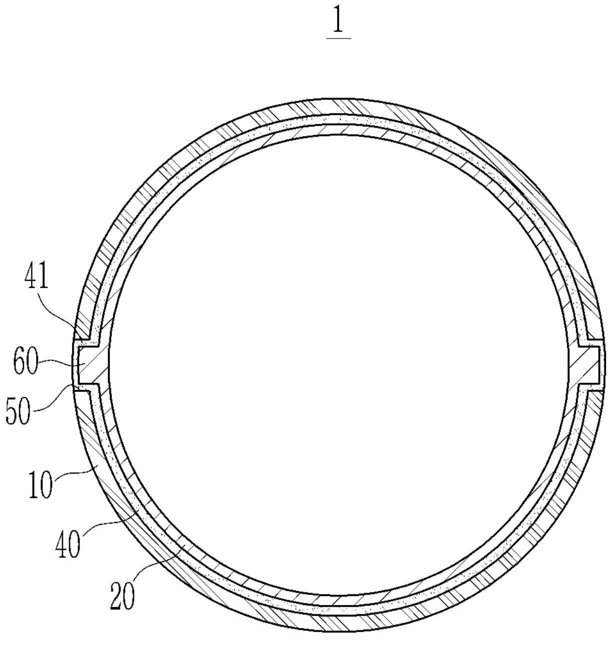
FIG. 4 is a cross-sectional view taken along a line IV-IV of FIG. 3.

FIG. 1 is a perspective view showing a rechargeable battery according to a first embodiment of the present invention, FIG. 2 is an exploded perspective view of a rechargeable battery of FIG. 1, FIG. 3 is a cross-sectional view taken along a line III-III of FIG. 1, and FIG. 4 is a cross-sectional view taken along a line IV-IV of FIG. 3.

Referring to FIG. 1 to FIG. 4, the rechargeable battery 1 according to the first embodiment includes an electrode assembly 30, a first case 10, and a second case 20. The first case 10 has a concave accommodating part 50 on the inner surface, and the second case 20 has a protruded part 60 (rotated and separated shown in FIG. 2) on the outer surface. When the second case 20 is mutually inserted and coupled to the first case 10, the accommodating part 50 of the first case 10 and the protruded part 60 of the second case 20 are coupled to each other.

In the drawing, the first case 10 forms the lower part of the rechargeable battery 1 and accommodates the electrode assembly 30 inserted through the first opening 11 provided on the upper side. The second case 20 has a second opening 21 smaller than the first opening 11 on the lower side, and is inserted and coupled in the first case 10 while covering the electrode assembly 30. On drawing, the second case 20 forms the upper part of the rechargeable battery 1.

In the rechargeable battery 1 of substantially the first embodiment, the side and upper surfaces of the electrode assembly 30 are accommodated and covered in the second case 20, and the lower surface of the electrode assembly 30 is accommodated and supported in the first case 10 while the second case 20 is accommodated inside the first case 10.

The first and second cases 10 and 20 coupled to each other form an electrically insulating state between the inner surface of the first case 10 and the outer surface of the second case 20 through an insulating material 40 provided between them.

In addition, the insulating material 40 includes an insulating material 41 interposed between the accommodating part 50 and the protruded part 60 when the first and second cases 10 and 20 are coupled to each other. The interposed insulating material 41 forms an electrically insulating state between the accommodating part 50 and the protruded part 60, and forms a closing and sealing structure to prevent leakage of an electrolyte solution when a microcavity occurs between the first and second cases 10 and 20.

The closing and sealing structure is formed in a structure that prevents the electrolyte solution and gas from leaking, like a packing, and may include a sealing structure. Here, the sealing means to close and seal the first and second cases 10 and 20 by attaching them together using an insulating material 41 like an adhesive.

When the accommodating part 50 and the protruded part 60 are combined, the first case 10 and the second case 20 are fastened to form a closed state that cannot be opened. The insulating material 40 is interposed between the protruded part 60 and the accommodating part 50 to close and seal the inside (inside of the rechargeable battery) and the outside where the first and second cases 10 and 20 are fastened.

The accommodating part 50 is formed as a through-hole or a groove in the first case 10, and may have a concave shape so that the protruded part 60 may be combined. As an example, the accommodating part 50 is formed concave in the diameter direction of the first case 10, and the protruded part 60 is formed convex in the diameter direction of the second case 20, and then the accommodating part 50 and the protruded part 60 are coupled to each other in the diameter direction. When viewed from a longitudinal cross-section, the protruded part 60 has a ¼ oval (or ¼ circular) shape, so it may be coupled to the accommodating part 60.

In the state where the protruded part 60 is coupled to the accommodating part 50, the insulating material 41 is interposed between the inner bottom of the first case 10 and the end of the second case 20 forming the second opening 21 to be electrically insulated.

Therefore, when a strong impact is applied to the rechargeable battery 1 by a drop, etc., it may be prevented that the first case 10 and the second case 20 are separated from each other in the opposite directions, or relatively rotated in the circumferential direction. However, although not shown, in a conventional rechargeable battery in which the first and second cases are sealed only with an insulating material without combining the protruded part and the accommodating part, the sealing part may be damaged during a strong impact, so that the mutual separation and the relative rotation may occur easily.

The electrode assembly 30 includes a first electrode 31 (for example, a negative electrode) and a second electrode 32 (for example, a positive electrode) provided on both surfaces of a separator 33 that is an electrical insulating material, and is formed by winding the first electrode 31, the separator 33, and the second electrode 32. Therefore, the electrode assembly 30 may be formed as a jelly roll type. Although not shown, the electrode assembly may be formed of the first electrode, the separator, and the second electrode as a stack type.

The electrode assembly 30 is configured to charge and discharge a current, and the wound axis in the electrode assembly 30 may be arranged parallel to the height direction of the first and second cases 10 and 20 (an up and down direction) in FIG. 1 to FIG. 3.

The first terminal (a lower cross-section of the electrode assembly) 391 and the second terminal (an upper cross-section of the electrode assembly) 392 of the electrode assembly 30 may be flat and parallel to each other. In the first embodiment, the electrode assembly 30 is not provided with a center pin, but may be provided with a center pin (not shown) at the position of the wound axis.

The first case 10 faces the first terminal 391 of both ends of the electrode assembly 30, and the second case 20 faces the second terminal 392 of both ends of the electrode assembly 30. At this time, the electrode assembly 30 is covered with the insulating sheet 14 and is embedded in the first and second cases 10 and 20 that are coupled to each other.

The electrode assembly 30 includes the first electrode tab 51 connected to the first electrode 31 and the second electrode tab 52 connected to the second electrode 32, and draw out the first second electrodes 31 and 32 to the first and second terminals 391 and 392, respectively.

In the state where the electrode assembly 30 is accommodated in the first and second cases 10 and 20, the first electrode tab 51 is electrically connected to the bottom of the first case 10, and the second electrode tab 52 is electrically connected to the upper portion of the second case 20.

When the first and second cases 10 and 20 are coupled together, the insulating material 41 interposed between the accommodating part 50 and the protruded part 60 forms an electrically insulating structure between the accommodating part 50 and the protruded part 60 and simultaneously forms a strong, close structure by closing and sealing between the first and second cases 10 and 20. Therefore, the insulating material 41 may further prevent the mutual separation and the relative rotation of the first and second cases 10 and 20 when a strong impact is applied to the rechargeable battery 1 by the dropping or the like.

Accordingly, the breakage of the first and second electrodes tab 51 and 52 in the rechargeable battery 1 may be further prevented. Since the first and second electrodes tabs 51 and 52 remain connected, the shorting of the first and second electrodes 31 and 32 by the first and second electrodes tabs 51 and 52 may be further prevented.

Hereinafter, the case where the first electrode 31 and the second electrode 32 is a negative electrode and a positive electrode is exemplified, so in the rechargeable battery 1, the lower first case 10 acts as a negative terminal, and the upper second case 20 acts as a positive terminal.

The present invention is not limited thereto, and the first electrode 31 and the second electrode 32 may be a positive electrode and a negative electrode, respectively. In this case, therefore, in the rechargeable battery, the lower first case acts as a positive terminal, and the upper second case acts as a negative terminal.

The first electrode (the negative electrode) 31 has a long strip shape, and includes a negative coated region as a region where a negative active material layer is applied to a current collector of a metal foil (for example, a Cu foil) and a negative uncoated region as a region where the active material is not coated. The negative uncoated region may be positioned at one end in the length direction of the negative electrode.

The second electrode (a positive electrode) 32 has a long band shape, and includes a positive coated region as a region where the positive active material layer is applied to the current collector of a metal foil (e.g., an Al foil) and a positive electrode uncoated region as a region where the active material is not applied. The positive electrode uncoated region may be positioned at one end in the length direction of the anode.

The first and second cases 10 and 20 allow the insertion of the electrode assembly 30 into the first and second openings 11 and 21 formed on one side, and form a space for accommodating the electrode assembly 30 and the electrolyte solution therein.

For example, the first and second cases 10 and 20 have a cylindrical shape having a height H lower than a diameter D, and have a circular shape with the first and second openings 11 and 21 so that the cylindrical electrode assembly 30 corresponding to the inner space is inserted.

On the other hand, in the rechargeable battery 1 of the first embodiment, in the state that the first and second openings 11 and 21 of the first and second cases 10 and 20 are combined with each other, a height H is set as the distance between the outer planes of the first and second cases 10 and 20 and a diameter D is set as the exterior circumference of the first case 10. At this time, the ratio of height H to diameter D is 1 or less ($H/D \leq 1$). Therefore, the rechargeable battery 1 of the first embodiment may form a thin coin or button as a coin-type battery or a button-type battery.

More specifically, the accommodating part 50 is formed as a through-hole in the first case 10. The through-hole is formed as a concave curved surface that forms a flat surface at the top and decreases in height toward the bottom. For example, the through-hole forms a semicircle on the inner surface of the first case 10. Since the through-hole of the first case 10 maximizes the diameter direction range of the accommodating part 50, the coupling range with the protruded part 60 of the second case 20 may be increased.

In addition, the through-hole of the first case 10 may prevent further the first case 10 and the second case 20 from being separated from each other in the combination opposite direction (the height direction) or being relatively rotated along the circumferential direction by the combination of the accommodating part 50 and the protruded part 60.

In the state where the protruded part 60 is coupled to the through-hole, the insulating material 40 includes an insulating material 42 interposed between the inner bottom of the first case 10 and the end of the second case 20 forming the second opening 21.

Since the amount of the change in the height direction of the first and second case 20 is minimized by combining the accommodating part 50 and the protruded part 60, the interposed insulating material 42 may form and maintain a stable thickness t.

That is, the combination of the accommodating part 50 and the protruded part 60 enables a more accurate combination of the first and second cases 10 and 20, and when the rechargeable battery 1 is mass-produced, the total height dispersion in a plurality of rechargeable batteries 1 may be reduced.

On the other hand, the protruded part 60 is formed as a convex curved surface that forms a flat surface at the upper part and decreases the protruded amount toward the lower part. For example, the protruded part 60 forms a semicircle, i.e., a quarter sphere, on the outer surface of the second case 20.

Also, the accommodating part 50 corresponding to the protruded part 60 has a concave curved surface facing the convex curved surface of the protruded part 60, and the interposed insulating material 41 electrically insulates the convex curved surface and the concave curved surface.

The flat and convex curved surface structure of the protruded part 60 and the concave curved surface of the accommodating part 50 effectively prevent the protruded part 60 from being separated from the accommodating part 50 after the mutual combination while inducing the bonding of the protruded part 60 to the accommodating part 50 by the bonding of the first and second cases 10 and 20.

When compared with another embodiment below, in the first embodiment, the protruded part 60 forms the lower part as a convex curved surface, so that when the first and second cases 10 and 20 are combined, it facilitates coupling to the concave curved surface of the accommodating part 60. Since the upper part of the protruded part 60 is formed as a flat surface, when the impact is applied to the first and second cases 10 and 20, the mutual separation becomes difficult while being caught on the plane of the accommodating part 60.

Hereinafter, a second embodiment and numerous variations of the present invention are described. The first and second embodiments are compared, and the variations are compared with the reference embodiments, and the same configurations are omitted and different configurations are described.

Figure 5:
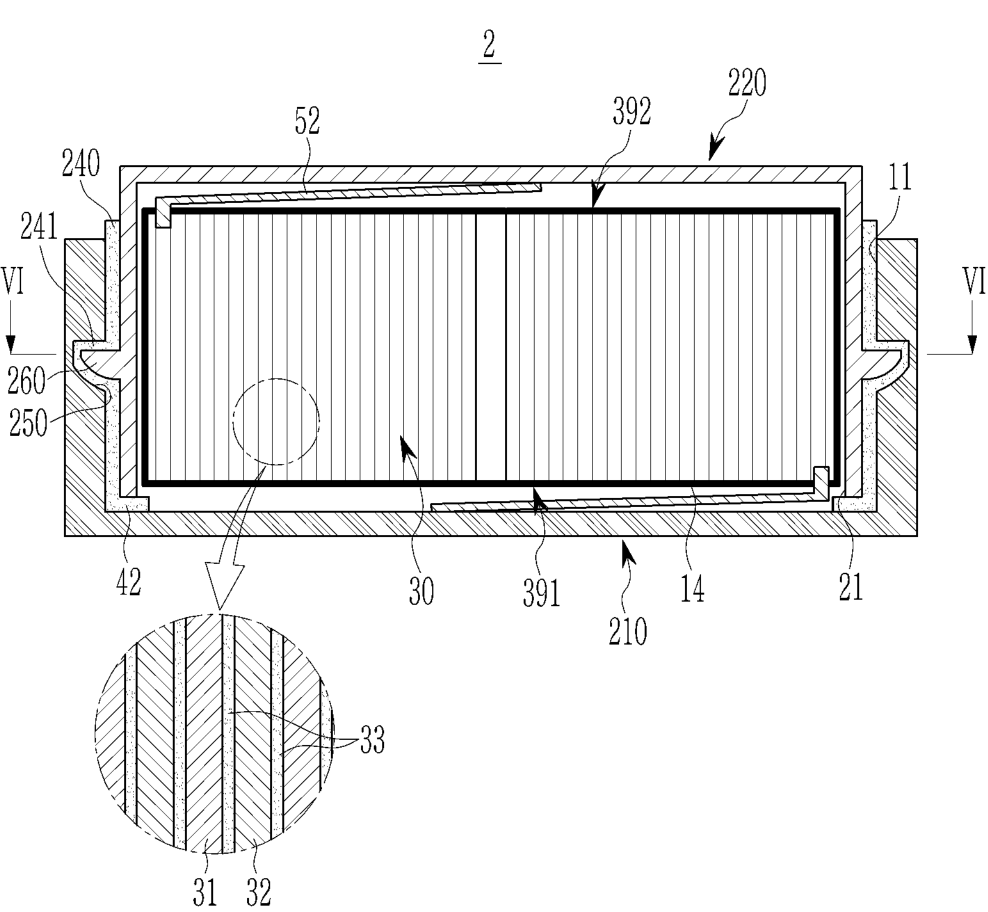
FIG. 5 is a cross-sectional view showing a rechargeable battery according to a second embodiment of the present invention.
Figure 6:
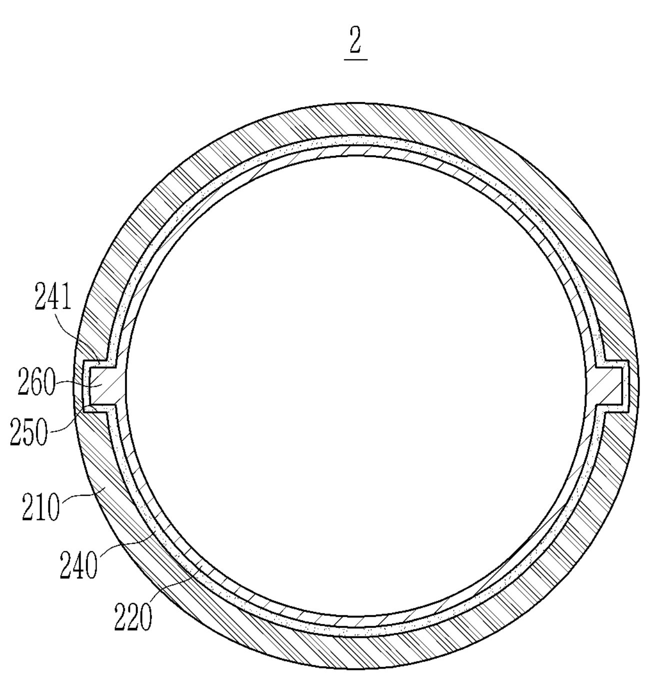
FIG. 6 is a cross-sectional view taken along a line VI-VI of FIG. 5.

FIG. 5 is a cross-sectional view showing a rechargeable battery according to a second embodiment of the present invention, and FIG. 6 is a cross-sectional view taken along a line VI-VI of FIG. 5. Referring to FIG. 5 and FIG. 6, in the rechargeable battery 2 of the second embodiment, the accommodating part 250 is formed as a groove in the first case 210. The groove is formed as a concave curved surface that forms a plane at the top and decreases in height toward the bottom. For example, the groove forms a semicircle on the inner surface of the first case 210, that is, a ¼ hollow surface. When viewed from the longitudinal cross-section, the protruded part 260 has a ¼ oval (or a ¼ circular) shape, so it may be coupled to the accommodating part 260.

Compared to the through-hole type of accommodating part 50, as the groove of the first case 210 reduces the diameter direction range of the accommodating part 250 and reduces the bonding range with the protruded part 260 of the second case 220, but maintains the closing and sealing of the first case 210, the burden of the leakage of the electrolyte solution may be removed compared to through-hole accommodating part 50.

In addition, compared to through-hole accommodating part 50, the prevention performance of the separation of the first case 210 and the second case 220 from each other or the relative rotation along the circumferential direction due to the combination of the accommodating part 250 and the protruded part 260 is reduced, however since the groove of the first case 210 maintains the closing and sealing of the first case 210, it is possible to eliminate the burden of the leakage of the electrolyte solution compared to the accommodating part 50 of the through-hole.

The insulating material 240 includes an insulating material 241 interposed between the accommodating part 250 and the protruded part 260 when the first and second cases 210 and 220 are coupled to each other. The interposed insulating material 241 electrically insulates the accommodating part 250 and the protruded part 260. Therefore, the accommodating part 250 of the groove may reduce the burden of the leakage of the intervening insulating material 241 for the electrolyte solution.

Figure 7:
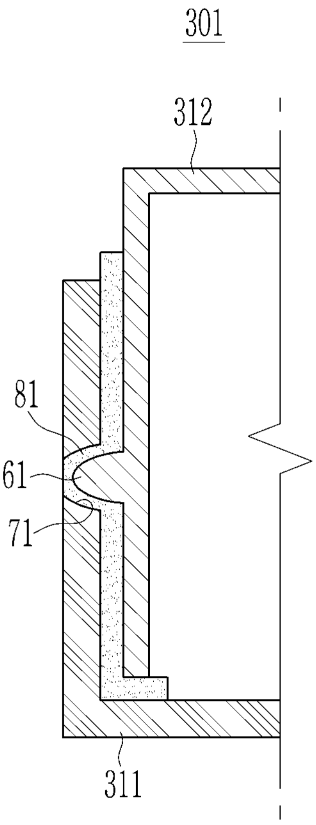
FIG. 7 is a cross-sectional view of a first modification of a rechargeable battery of a first embodiment of the present invention.

FIG. 7 is a cross-sectional view of a first modification of a rechargeable battery of a first embodiment of the present invention. Referring to FIG. 7, in the rechargeable battery 301 of the first modification, the protruded part 61 is formed with a upper convex curved surface and a lower convex curved surface that form a semi-ellipsoid along the diameter direction on the outer surface of the second case 312, and are maximally protruded in the diameter direction at the tip of the semi-ellipsoid, and have the protruded amount decreased toward the upper and lower parts. When viewed from the longitudinal cross-section, the protruded part 61 has a semi-elliptical (or a semi-circular) shape, so that it may be coupled to the accommodating part 71.

The accommodating part 71 inside the first case 311 has an upper concave curved surface and a lower concave curved surface facing the upper convex curved surface and the lower convex curved surface. When assembling the first and second cases 311 and 312, the insulating material 81 interposed between them is interposed between the upper convex curved surface and the upper concave curved surface, and between the lower convex curved surface and the lower concave curved surface of the protruded part 61 and the accommodating part 71 to electrically insulate both of them.

Since the insulating material 81 forms an insulating structure with the convex curved surface and the concave curved surface, the electrical insulation performance between the protruded part 61 and the accommodating part 71 is further improved compared to the insulating structures of the protruded part 60 and the accommodating part 50 of the first embodiment.

In addition, the insulating material 81 forms a closing and sealing structure while forming the electrically insulating state between the accommodating part 71 and the protruded part 61 to prevent the leakage of the electrolyte solution when a microcavity occurs between the first and second cases 311 and 312. The closing and sealing structure may include a sealing structure.

Figure 8:
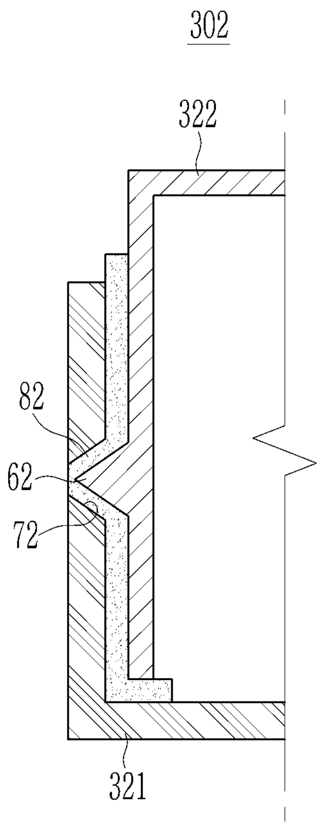
FIG. 8 is a cross-sectional view of a second modification of a rechargeable battery of a first embodiment of the present invention.

FIG. 8 is a cross-sectional view of a second modification of a rechargeable battery of a first embodiment of the present invention. Referring to FIG. 8, in the rechargeable battery 302 of the second modification, the protruded part 62 forms a cone along the diameter direction on the outer surface of the second case 322. When viewed from the longitudinal cross-section, the protruded part 62 has a triangle shape, so it may be coupled to the accommodating part 72.

The accommodating part 72 of the first case 321 has an inclined surface facing the cone. When assembling the first and second cases 321 and 322, the insulating material 82 interposed between each other electrically insulates the cones and inclined surfaces of the protruded part 62 and the accommodating part 72.

Since the insulating material 82 forms the insulating structure with the cone and the inclined surface, the electrical insulation performance between the protruded part 62 and the accommodating part 72 may be improved compared to the insulating structure of the protruded part 60 and the accommodating part 50 of the first embodiment.

In addition, the insulating material 82 forms the closing and sealing structure to prevent the leakage of the electrolyte solution when a microcavity occurs between the first and second cases 321 and 322 while electrically insulating the accommodating part 72 and the protruded part 62. The closing and sealing structure may contain a sealing structure.

Figure 9:
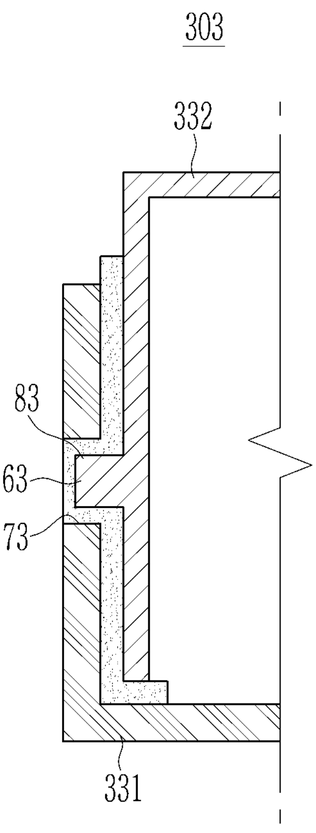
FIG. 9 is a cross-sectional view of a third modification of a rechargeable battery of a first embodiment of the present invention.

FIG. 9 is a cross-sectional view of a third modification of a rechargeable battery of a first embodiment of the present invention. Referring to FIG. 9, in the third rechargeable battery 303 of the modified example, the protruded part 63 forms a pillar along the diameter direction on the outer surface of the second case 332. For example, the pillar may be a circular cylinder or an elliptical cylinder. When viewed from the longitudinal cross-section, the protruded part 63 has a quadrangle shape, so that it may be coupled to the accommodating part 73.

The accommodating part 73 of the first case 331 has the interior circumference facing the column. When assembling the first and second cases 331 and 332, the insulating material 83 interposed between them electrically insulates the protruded part 63 and the column and the interior circumference of the accommodating part 73.

Since the insulating material 83 forms the insulating structure with the columns and the interior circumference, the similar electrical insulation performance may be realized between the protruded part 63 and the accommodating part 73 compared with the insulating structure of the protruded part 60 and the accommodating part 50 of the first embodiment.

In addition, insulating material 83 forms the closing and sealing structure to prevent the leakage of the electrolyte solution when a microcavity occurs between the first and second cases 331 and 332 while electrically insulating the accommodating part 73 and the protruded part 63. The closing and sealing structure may include a sealing structure.

Figure 10:
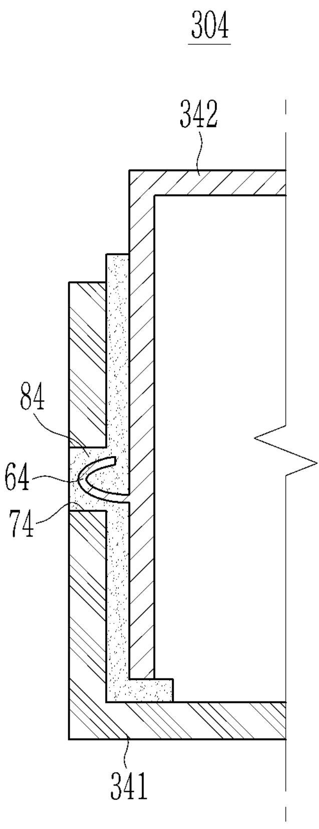
FIG. 10 is a cross-sectional view of a fourth modification of a rechargeable battery of a first embodiment of the present invention.

FIG. 10 is a cross-sectional view of a fourth modification of a rechargeable battery of a first embodiment of the present invention. Referring to FIG. 10, in the rechargeable battery 304 of the fourth modification, the protruded part 64 forms an opened ring along the diameter direction on the outer surface of the second case 342. When viewed in the longitudinal cross-section, the protruded part 64 has an opened semi-elliptical ring shape, so that it may be coupled to the accommodating part 74.

The accommodating part 74 of the first case 341 has the interior circumference facing the opened ring. When assembling the first and second cases 341, and 342, the insulating material 84 interposed between them electrically insulates the protruded part 64 and the opened ring and the interior circumference of the accommodating part 74.

Since the insulating material 84 forms the insulating structure with the opened ring and the interior circumference, the electrical insulation performance between the protruded part 64 and the accommodating part 74 may be further improved compared to the insulating structures of the protruded part 60 and the accommodating part 50 of the first embodiment, and the bonding strength between the protruded part 64 and the accommodating part 74 may be further improved.

In addition, the insulating material 84 forms a closing and sealing structure to prevent the leakage of the electrolyte solution when a microcavity occurs between the first and second cases 341 and 342 while electrically insulating the accommodating part 74 and the protruded part 64. The closing and sealing structure may include a sealing structure.

Figure 11:
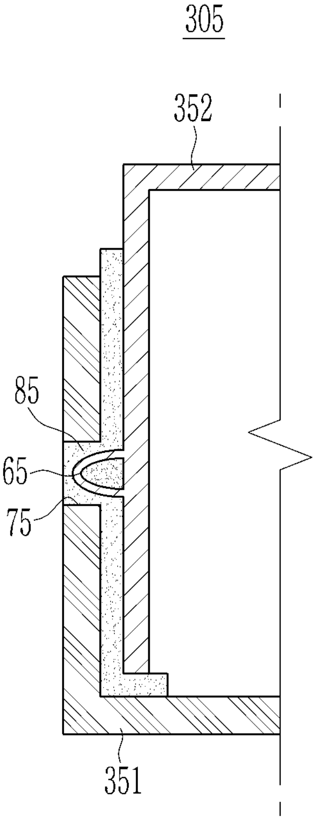
FIG. 11 is a cross-sectional view of a fifth modification of a rechargeable battery of a first embodiment of the present invention.

FIG. 11 is a cross-sectional view of a fifth modification of a rechargeable battery of a first embodiment of the present invention. Referring to FIG. 11, in the rechargeable battery 305 of the fifth modification, the protruded part 65 forms a closed ring along the diameter direction on the outer surface of the second case 352. When viewed in the longitudinal cross-section, the protruded part 65 has a closed semi-elliptical ring shape, so that it may be coupled to the accommodating part 75.

The accommodating part 75 of the first case 351 has the interior circumference facing the closed ring. When assembling the first and second cases 351 and 352, the insulating material 85 interposed between them seals the protruded part 65 and the closed ring and the interior circumference of the accommodating part 75 with the electrical insulation.

Since the insulating material 85 forms an insulating structure with the closing ring and the interior circumference, the electrical insulation performance between the protruded part 65 and the accommodating part 75 may be further improved compared to the insulating structure of the protruded part 60 and the accommodating part 50 of the first embodiment.

In addition, since the closed ring, that is, the inside of the protruded part 65 forms an empty space, compared to the insulating structure of the protruded part 60 and the accommodating part 50 of the first embodiment, the impact transmitted between the protruded part 65 and the accommodating part 75 of the rechargeable battery 305 may be further absorbed, thereby the safety of the rechargeable battery 305 may be further improved.

Figure 12:
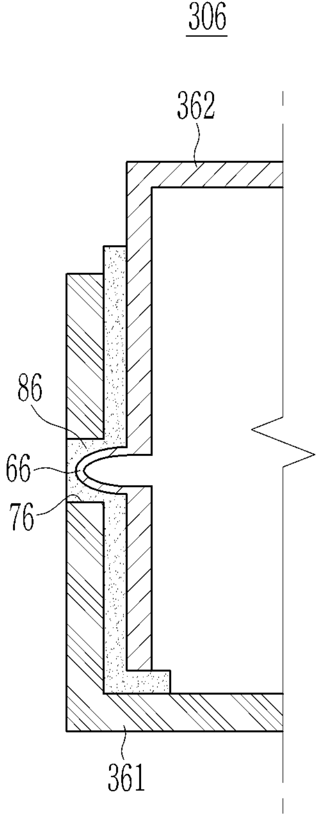
FIG. 12 is a cross-sectional view of a sixth modification of a rechargeable battery of a first embodiment of the present invention.

FIG. 12 is a cross-sectional view of a sixth modification of a rechargeable battery of a first embodiment of the present invention. Referring to FIG. 12, in the rechargeable battery 306 of the sixth modified example, the protruded part 66 forms an elongated portion extending along the diameter direction on the outer surface of the second case 362. When viewed from the longitudinal cross-section, the protruded part 66 has a semi-elliptical cylindrical (or a hemispheric cylindrical) shape, so that it may be coupled to the accommodating part 76.

The accommodating part 76 of the first case 361 has the interior circumference facing the enlarged portion. When assembling the first and second cases 361 and 362, the insulating material 86 interposed between them seals the protruded part 66 and the enlarged portion and the interior circumference of the accommodating part 76 in an electrically insulating state.

Since the insulating material 86 forms an insulating structure with the enlarged portion and the interior circumference, compared to the insulating structure of the protruded part 60 and the accommodating part 50 of the first embodiment, the electrical insulation performance between the protruded part 66 and the accommodating part 76 may be further improved.

In addition, since the enlarged portion, that is, the inside of the protruded part 66 forms an empty space, compared to the insulating structure of the protruded part 60 and the accommodating part 50 of the first embodiment, the impact transmitted between the protruded part 66 and the accommodating part 76 of the rechargeable battery 306 may be absorbed more, thereby the safety of the rechargeable battery 306 may be further improved.

In addition, the insulating material 86 forms a closing and sealing structure to prevent the leakage of the electrolyte solution when a microcavity occurs between the first and second cases 361 and 362 while electrically insulating the accommodating part 76 and the protruded part 66. The closing and sealing structure may include a sealing structure.

For example, in the sixth modified example, the protruded part 66 for forming the enlarged portion by the drawing method may be more easily formed than the protruded part 65 for forming the closed ring by the welding method in the fifth modified example.

The first embodiment and the first to sixth modifications thereof vary the protruded parts 60, 61, 62, 63, 64, 65, and 66 and the accommodating parts 50, 71, 72, 73, 74, 75, and 76 exemplifies it to be variously formed. Although not shown separately, the protruded parts 61, 62, 63, 64, 65, and 66 and the accommodating parts 71, 72, 73, 74, 75, and 76 of the first modified example to the sixth modified example of the first embodiment may be applied in the same way as the protruded part 260 and the accommodating part 250 of the second embodiment.

Figure 13:
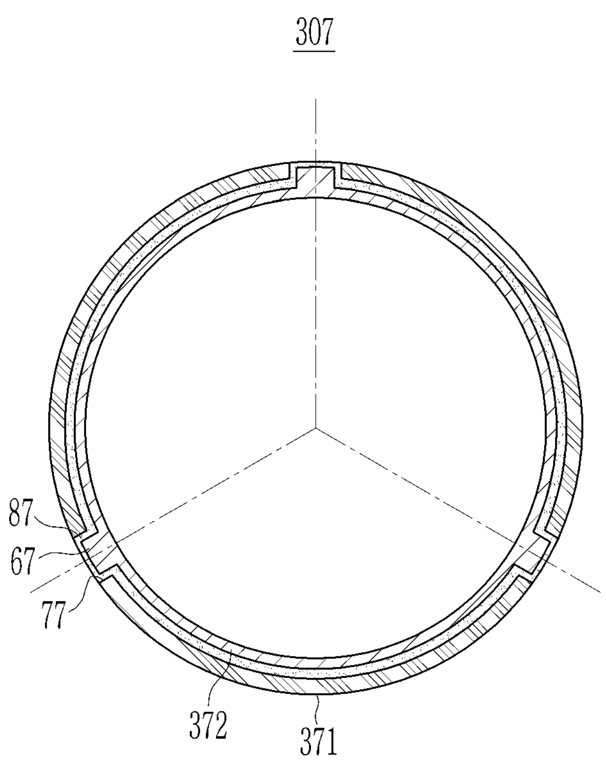
FIG. 13 is a cross-sectional view of a seventh modification of a rechargeable battery of a first embodiment of the present invention.
Figure 14:
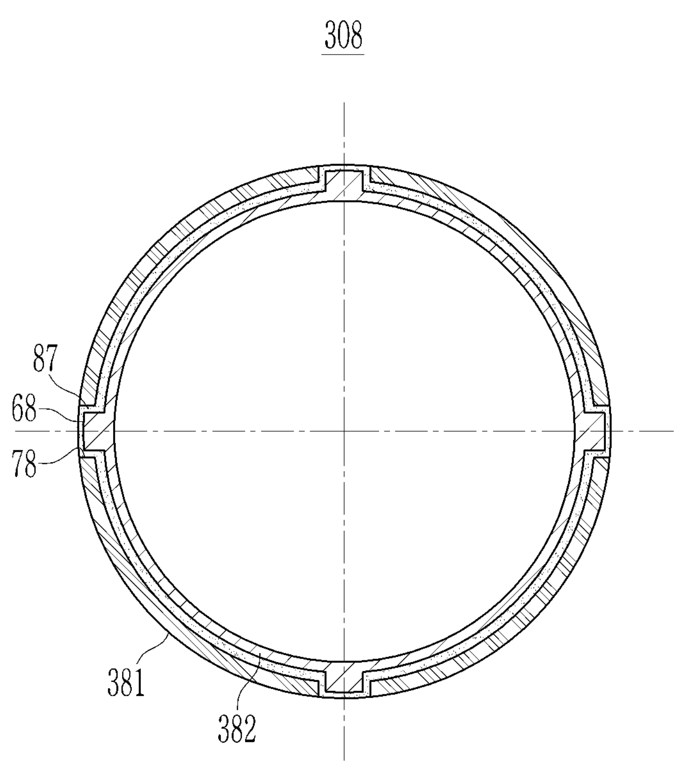
FIG. 14 is a cross-sectional view of an eighth modification of a rechargeable battery of a first embodiment of the present invention.

FIG. 13 is a cross-sectional view of a seventh modification of a rechargeable battery of a first embodiment of the present invention, and FIG. 14 is a cross-sectional view of an eighth modification of a rechargeable battery of a first embodiment of the present invention. Referring to FIG. 13 and FIG. 14, in the rechargeable batteries 307 and 308 of the seventh and eighth variants, the accommodating parts 77 and 78 are provided in plural (as an example, three or four) and are disposed at an equal interval along the circumferential direction of the first cases 371 and 381, and the protruded parts 67 and 68 are provided in plural (for example, three or four) corresponding to the accommodating parts 77 and 78, and are disposed at an equal interval along the circumferential direction of the second cases 372 and 382. A plurality of protruded parts 67 and 68 and accommodating parts 77 and 78 may form a mass center in the center of the rechargeable batteries 307 and 308.

When assembling the first cases 371 and 381 and the second cases 372 and 382, the insulating materials 87 and 88 interposed between them electrically insulates the protruded parts 67 and 68 and the accommodating parts 77 and 78.

In addition, the insulating materials 87 and 88 may form a closing and sealing structure while forming an electrically insulating state between the accommodating parts 77 and 78 and the protruded parts 67 and 68 to prevent the leakage of the electrolyte solution when a microcavity occurs between the first cases 371 and 381 and the second cases 372 and 382. The closing and sealing structure may include a sealing structure.

Since a plurality of accommodating parts 77 and 78 provided in the first cases 371 and 381 are combined with a plurality of protruded parts 67 and 68 provided in the second cases 372 and 382, during battery safety tests such as a drop test or a rotation test of the rechargeable batteries 307 and 308, mutual separation and relative rotation of the first cases 371 and 381 and the second cases 372 and 382 may be further prevented.

The rechargeable batteries 307 and 308 of the seventh and eighth variants apply three and four protruded parts 67 and 68 and accommodating parts 77 and 78, respectively, and two protruded parts 60 and accommodating parts 50 are respectively applied in the rechargeable battery 1 of the first embodiment. The protruded part and the accommodating part may be formed in greater numbers.

Although not shown separately, the protruded parts 61, 62, 63, 64, 65, and 66 and the accommodating parts 71, 72, 73, 74, 75, and 76 of the first to sixth variant rechargeable batteries 301, 302, 303, 304, 305, and 306 may be equally applied to a plurality of protruded parts 67 and 68 and a plurality of accommodating parts 77 and 78 of the rechargeable batteries 307 and 308 of the seventh and eighth variants.

Figure 15:
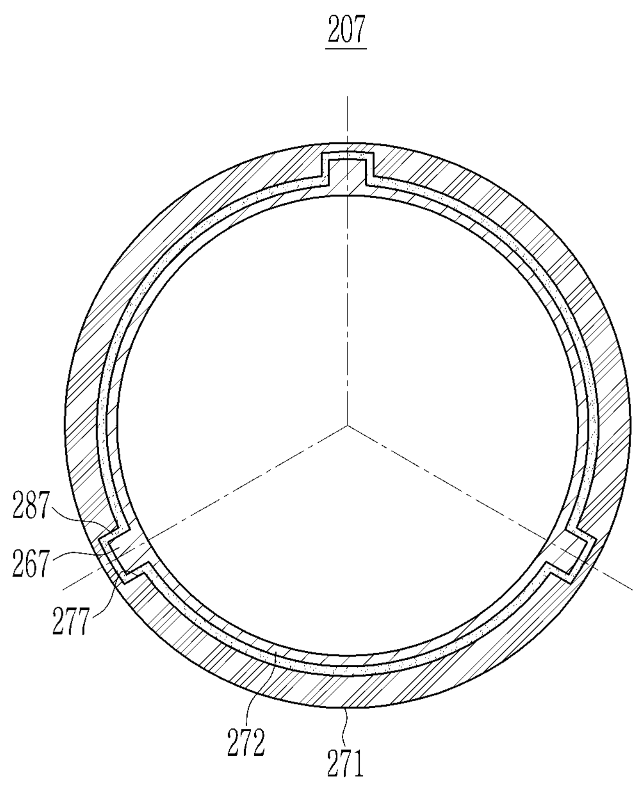
FIG. 15 is a cross-sectional view of a first modification of a rechargeable battery of a second embodiment of the present invention.
Figure 16:
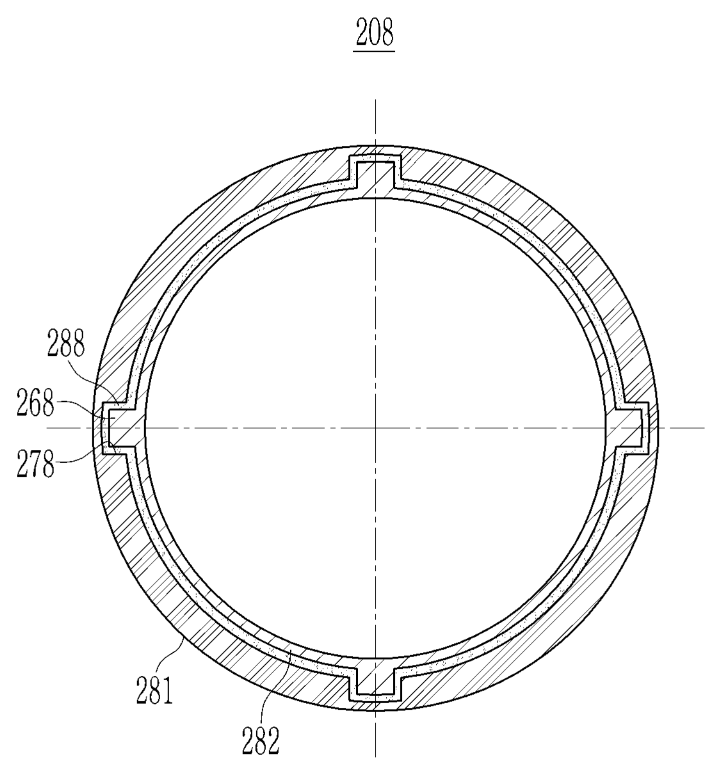
FIG. 16 is a cross-sectional view of a second modification of a rechargeable battery of a second embodiment of the present invention.

FIG. 15 is a cross-sectional view of a first modification of a rechargeable battery of a second embodiment of the present invention, and FIG. 16 is a cross-sectional view of a second modification of a rechargeable battery of a second embodiment of the present invention. Referring to FIG. 15 and FIG. 16, in the rechargeable batteries 207 and 208 of the first and second variants, the accommodating parts 277 and 278 are provided in plural (for example, three or four) and are disposed at an equal interval along the circumferential direction of the first cases 271 and 281, and the protruded parts 267 and 268 (for example, three or four) are provided in plural corresponding to the accommodating parts 277 and 278 and disposed at an equal interval along the circumferential direction of the second cases 272 and 282.

When assembling the first cases 271 and 281 and the second cases 272 and 282, the insulating materials 287 and 288 interposed between them electrically insulate the protruded parts 267 and 268 and the accommodating parts 277 and 278.

Since a plurality of protruded parts 267 and 268 in the second cases 272 and 282 are coupled to a plurality of accommodating parts 277 and 278 in the first cases 271 and

281, in a case of the impact such as dropping of the rechargeable batteries 207 and 208, the mutual separation and the relative rotation of the first cases 271 and 281 and the second cases 272 and 282 may be further prevented.

In the rechargeable batteries 207 and 208 of the first and second modifications, three and four protruded parts 267 and 268 and accommodating parts 277 and 278 are applied, respectively, and two protruded parts 260 and accommodating parts 250 are respectively applied in the rechargeable battery 2 of the second embodiment. However, the present invention is not limited thereto, and the protruded part and the accommodating part may be formed in a greater number of four or more.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

1, 2, 207, 208, 301, 302, 303, 304, 305, 306, 307, 308: rechargeable battery
10, 210, 271, 281, 311, 321, 331, 341, 351, 361, 371, 381: first case
11, 21: first, second opening
14: insulating sheet
20, 220, 272, 282, 312, 322, 332, 342, 352, 362, 372, 382: second case
30: electrode assembly
31, 32: first, second electrode (negative, positive electrode)
33: separator
51, 52: first, second electrode tab
60, 260, 61, 62, 63, 64, 65, 66, 67, 68, 267, 268: protruded part
50, 250, 71, 72, 73, 74, 75, 76, 77, 78, 277, 278: accommodating part
40, 41, 42, 240, 241, 81, 82, 83, 84, 85, 86, 87, 88, 287, 288: insulating material
391: first terminal (lower cross-section of electrode assembly)
392: second terminal (upper cross-section of electrode assembly)
D: diameter
H: height
t: thickness

The invention claimed is:

1. A rechargeable battery comprising:
a first case accommodating an electrode assembly and having a first opening;
a second case having a second opening smaller than the first opening, the second case covering the electrode assembly and an outer surface of the second case being coupled to an inner surface of the first case;
an insulating material interposed between the first case and the second case to form an electrically insulating state;
a plurality of protruded parts protruding from the outer surface of the second case; and
a plurality of accommodating parts formed in the first case and coupled to the plurality of protruded parts,
wherein the first case and the second case are coupled together to form a closed state in which the plurality of protruded parts extend into the plurality of accommodating parts, and
wherein each of the plurality of accommodating parts is an opening at an intermediate portion of the first case spaced apart from the first opening,
wherein a portion of the insulating material extends into the plurality of accommodating parts and is interposed between the plurality of protruded parts and the plurality of accommodating parts.

2. The rechargeable battery of claim 1, wherein
the electrode assembly includes a first electrode, a second electrode, and a separator disposed therebetween,
the first case is connected to the first electrode by a first electrode tab, and
the second case is connected to the second electrode with a second electrode tab.

3. The rechargeable battery of claim 1, wherein
the insulating material is interposed between the plurality of protruded parts and the plurality of accommodating parts to close and seal the inside and outside where the first case and the second case are fastened.

4. The rechargeable battery of claim 1, wherein
each of the plurality of accommodating parts is formed as a through-hole or a groove in the first case, and
a concave shape to which the protruded part is coupled.

5. The rechargeable battery of claim 4, wherein
when viewed in a longitudinal cross-section, each of the plurality of protruded parts has one shape selected from the group consisting of a quarter ellipse, a semi-ellipse, a triangle, a quadrangle, an opened semi-elliptical ring, a closed semi-elliptical ring, and a semi-elliptical cylinder, and wherein each of the plurality of protruded parts has a convex shape that is coupled to one of the plurality of accommodating parts.

6. The rechargeable battery of claim 1, wherein:
in a state that the plurality of protruded parts is coupled to the plurality of accommodating parts,
the insulating material is interposed between an inner bottom of the first case and an end of the second case forming the second opening to be electrically insulated.

7. The rechargeable battery of claim 1, wherein:
the plurality of accommodating parts is disposed at an equal interval along a circumferential direction of the first case, and
the plurality of protruded parts correspond to the plurality of accommodating parts and is disposed at an equal interval along a circumferential direction of the second case.

* * * * *